United States Patent [19]

Cheng et al.

[11] 4,419,187
[45] Dec. 6, 1983

[54] APPARATUS AND METHOD FOR THERMAL MEMBRANE DISTILLATION

[75] Inventors: Dah Y. Cheng, Los Altos; Steve J. Wiersma, Sunnyvale, both of Calif.

[73] Assignee: International Power Technology, Inc., Sunnyvale, Calif.

[21] Appl. No.: 354,711

[22] Filed: Mar. 4, 1982

Related U.S. Application Data

[63] Continuation of Ser. No. 170,897, Jul. 21, 1980, abandoned, which is a continuation-in-part of Ser. No. 12,047, Feb. 14, 1979, Pat. No. 4,265,713.

[51] Int. Cl.³ ............................................. B01D 3/02
[52] U.S. Cl. ..................................... 202/200; 55/158; 159/DIG. 27; 203/11; 203/DIG. 17
[58] Field of Search ................ 55/16, 158; 159/47 R, 159/49, DIG. 8, DIG. 27; 203/10, 11, DIG. 17; 210/490, 640, 500.2; 264/22; 202/200

[56] References Cited

U.S. PATENT DOCUMENTS

| 2,984,623 | 5/1961 | Lee | 210/640 |
| 3,648,845 | 3/1972 | Riley | 210/500.2 |
| 3,847,652 | 11/1974 | Fletcher et al. | 264/22 |
| 4,203,848 | 5/1980 | Grandine | 210/490 |

Primary Examiner—Frank Sever
Attorney, Agent, or Firm—Limbach, Limbach & Sutton

[57] ABSTRACT

Apparatus and method for improved thermal membrane distillation utilizes a composite membrane comprised of a microporous lyophobic layer having deposited thereon an essentially nonporous lyophilic coating.

5 Claims, 3 Drawing Figures

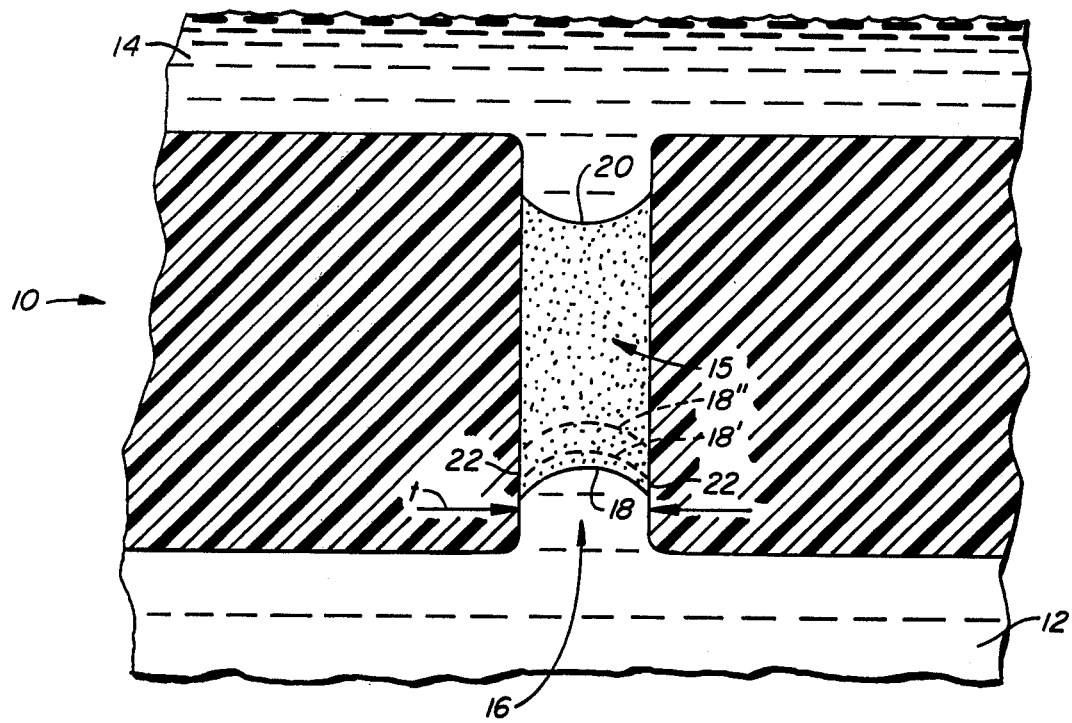
FIG._1.  PRIOR ART
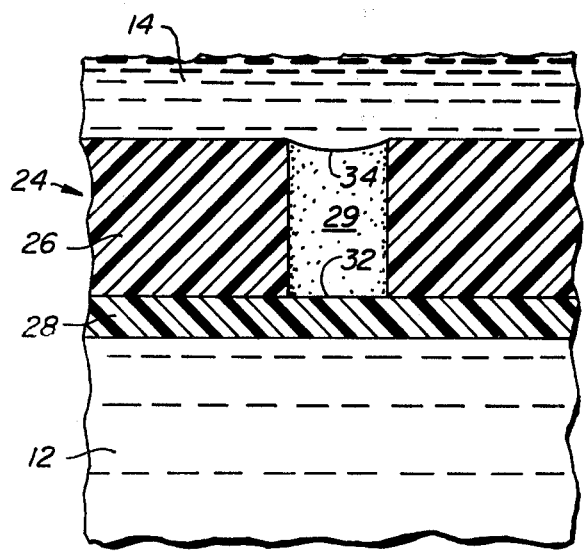
FIG._2.
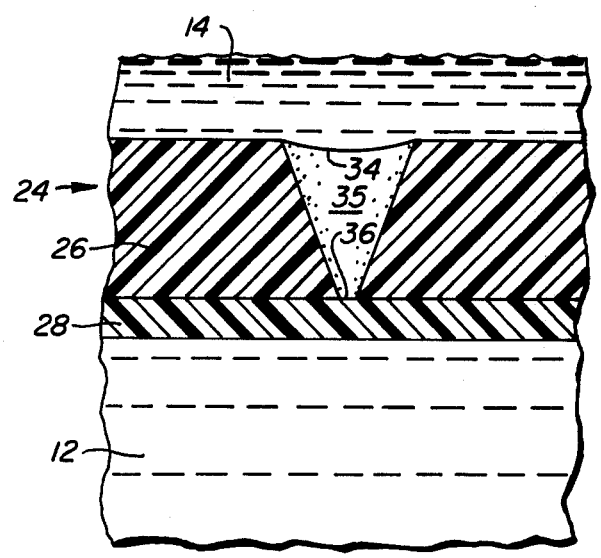
FIG._3.

APPARATUS AND METHOD FOR THERMAL MEMBRANE DISTILLATION

This application is a continuation of U.S. patent application Ser. No. 170,897, filed July 21, 1980 and now abandoned which was a continuation-in-part of Ser. No. 12,047, filed Feb. 14, 1979 issued May 5, 1981 as U.S. Pat. No. 4,265,713.

The parent application describes a method and apparatus for thermal membrane distillation which overcomes the traditional problems of water-logging which hinder the continuous operation of a distillation system.

BACKGROUND OF THE INVENTION

This invention embodies an improved membrane comprised of a microporous lyophobic layer having deposited thereon an essentially nonporous lyophilic coating.

Conventional distillation requires heating the distilland to the boiling point of one or more of the constituents of the distilland and then recovering and condensing the resulting vapor to a liquid, the distillate.

Distillation has also been accomplished at much lower temperatures through the use of a membrane across which a vapor pressure gradient is maintained. Previously, porous lyophobic membranes were used for thermal distillation and desalination.

The terms "lyophobic" and "lyophilic" are employed here to describe the wettability of a liquid on a solid surface. Lyophobic describes a non-wetting behavior of a liquid such that the contact angle between a liquid and a solid is greater than 90° so that the liquid tends to ball up and easily run off the surface. Lyophilic describes a wetting behavior of a liquid such that the contact angle between a liquid and a solid is less than 90° and the liquid easily spreads over the solid.

The contact angle or wettability depends on the relative molecular attraction between both the solid and liquid and the liquid molecules themselves. If the attraction of the liquid for the solid is more than that for itself, the contact angle is less than 90°; wetting is said to occur and the liquid is said to be lyophilic with respect to the solid. A liquid is lyophobic with respect to a solid when the attraction of the liquid for the solid is less than that for itself thereby creating a contact angle greater than 90°.

When the liquid is water, the terms hydrophobic and hydrophilic are generally substituted for the more inclusive designations.

It is the primary object of this invention to provide an improved membrane and method for thermal distillation which prevents water-logging within the pores of the membrane.

Another object of this invention is to improve the rate of thermal distillation by providing a thinner membrane.

Another object of this invention is to prevent back-streaming of the distillate into the distilled and the concomitant loss of distilled product.

Another object of this invention is to provide a unitary composite membrane which is not subject to mechanical problems resulting in separation of the membrane layers.

The accomplishment of these objectives is explained more fully below.

SUMMARY OF THE INVENTION

This invention consists of a composite membrane, apparatus and method for thermal distillation comprising a microporous lyophobic layer having deposited thereon an essentially nonporous lyophilic coating.

BRIEF DESCRIPTION OF THE DRAWINGS

FIG. 1 is an enlarged sectional view of a conventional, single-layer, lyophobic porous membrane distillation device;

FIG. 2 is an enlarged sectional view of a membrane in accordance with the present invention which consists of a lyophobic layer having symmetrically shaped micropores and having deposited thereon an essentially nonporous lyophilic coating.

FIG. 3 is an enlarged sectional view of a membrane in accordance with the present invention which consists of a lyophobic layer having asymmetrically shaped micropores and having deposited thereon an essentially nonporous lyophilic coating.

DETAILED DESCRIPTION OF THE DRAWINGS

FIG. 1 is a sectional enlargement of a single lyophobic membrane 10 separating a distilland 12, such as salt water, and a distillate 14, which is fresh water. A pore 16 extends across the lyophobic membrane 10. Due to the properties of the non-wetting lyophobic material at low pressures, liquid is prevented from entering into the pores of the lyophobic membrane 10. Initially, neither the salt water 12 nor fresh water 14 penetrates within the gaseous region 15 of pore 16. Two convex shaped liquid-vapor surfaces 18 and 20 are defined at each end of pore 16.

A disequilibrium state exists between the two interfaces 18 and 20 if the distilland 12 has a higher equilibrium vapor pressure than the distillate 14. The distilland 12 is heated to a temperature slightly in excess of the distillate 14. Pure water evaporates into the capillary pore 16 at the hotter distilland side of the membrane and the vapor is condensed at the vapor-liquid interface 20 on the cooler distillate side 14 in an effort to establish local vapor pressure equilibrium. The result is the creation of a net flux of water vapor across the pore 16 of the lyophobic membrane 10.

In distillation apparatus using the single hydrophobic membrane 10 of FIG. 1, typically after several days, the vapor barrier across the pores is destroyed due to water-logging, and hence the distillation process through the membrane 10 ceases. The distilland liquid-vapor interface 18 migrates in a direction toward the distillate side 14, as indicated by 18' and 18", until eventually it intersects the liquid-vapor interface 20 on the distillate side of the membrane 10. This destroys the gaseous barrier needed for the distillation process to occur.

It is believed that the reason that water-logging occurs in desalination is due to the effect of the dissolved salt in the distilland 12. The saline solution changes the lyophobic property of the membrane 10 where the liquid-vapor interface 18 contacts the side wall 22 of the pore 16. As a result, the salt water, rather than being prevented from filling the pore 16, is able to migrate within the pore 16, eventually completely filling it with liquid. A possible explanation for the alteration of the normally lyophobic property of membrane 10 follows.

During distillation, for a given pressure, evaporation takes place at approximately a constant temperature.

Addition of heat increases the kinetic energy of some liquid molecules enough to overcome the evaporation energy barrier or the latent heat of evaporation. The latent heat of evaporation is a result of molecular attraction of the molecules which are tightly packed in the liquid phase. At the interface between the vapor and the liquid, there is an energy barrier created by an unbalanced attracting surface force for vapor molecules onto the interface surface. The very short mean free path (average molecular distance) on the liquid side compared with the vapor side creates the unbalanced forces at the interface. This is the phenomenon which creates surface tension.

In saline solutions surface tension is a function of salt concentration. Salt concentration increases at the edge of the liquid-vapor interface 18 adjacent to pore wall 22 due to local surface tension alterations caused by the effects of the lyophobic material on the salt water. This condition modifies the surface tension there, which in turn modifies the liquid-vapor interface curvature and increases the rate of evaporation of water and causes salt precipitation to occur along the edge 22 of the liquid-vapor interface, rendering the lyophobic wall of the membrane lyophilic. The original boundary is therefore not maintained, and the liquid-vapor interface 18 migrates to position 18′. Eventually, migration causes the salt water interface to collide with the fresh water interface, and water-logging occurs.

The length of time it takes for water-logging to occur depends upon a number of variables; typically, however, it only takes a few days for water-logging to occur and for the distillation process top stop completely.

FIG. 2 is an enlarged sectional view of a membrane 24 in accordance with the present invention which consists of a lyophobic layer 26 having symmetrically shaped micropores 29 and having deposited thereon an essentially nonporous lyophilic coating 28. The lyophilic coating 28 is adjacent to distilland 12 and the lyophobic layer 26 is adjacent the distillate 14. In the embodiment described, the distilland 12 is salt water and the distillate 14 is fresh water.

As with the single lyophobic distillation membrane 10 of FIG. 1, evaporation and condensation take place across each micropore 29. The distilland 12 is heated to a temperature in excess of the distillate 14, creating a vapor pressure gradient across the composite membrane 24. A net evaporation takes place at the liquid-vapor interface 32 and a net condensation occurs at the fresh water-vapor interface 34. However, unlike the case of the single lyophobic distillation membrane, water-logging does not occur within the composite membrane 24 especially if the evaporation rate is greater than the liquid migration rate through the lyophilic layer.

The vapor transport rate across the pore 29 is dependent on the vapor pressure gradient across the pore cavity, i.e., on the vapor pressure difference at the evaporating liquid-vapor interface 32 and the condensing vapor-liquid interface 34. The vapor pressure is a function of the temperature, salt concentration, and surface curvature. Therefore, all three properties must be considered in creating the desired vapor pressure gradient across the composite membrane 24.

The system can be operated at temperatures as low as 60° F. (15.6° C.) to as high as 300° F. (148.9° C.) if the system is pressurized. Preferably, it is operated between 100° F. (37.8° C.) and 240° F. (115.6° C.). Most preferably, it is operated between 120° F. (48.9° C.) and 212° F. (100° C.) for a system not requiring pressurization.

The proper selection of pore sizes for the lyophobic layer 26 is important in maximizing the distillate production rate and insuring uninterrupted flow through the composite membrane for a given temperature and temperature difference. The pore sizes should be chosen to withstand at least the hydraulic pressure exerted by the liquids on either side of the membrane.

"Bubble pressure" is defined as the pressure required to overcome the capillary surface tension. Since the vapor pressure within the pore may be much lower than atmospheric pressure, the bubble pressure must exceed the absolute hydraulic pressure across the membrane.

The bubble pressure is directly related to pore diameter. Since the porous lyophobic material has a distribution of pore diameters, the maximum absolute pressure on either side of the lyophobic membrane must not exceed the bubble pressure for the largest pores. Because capillary forces are greater for smaller pores, bubble pressure increases as pore size decreases.

Ideally, the maximum pore diameter is less than 0.4 microns ($\mu$m). Optimum pore sizes for systems designed for purposes other than water desalination may differ.

Fluoro-substituted vinyl polymers which are suitably lyophobic are ideal materials for the microporous lyophobic layer of the composite membrane. Polytetrafluoro-ethylene (PTFE) is the most lyophobic polymeric membrane material known. Polyvinylidene fluoride ($PVF_2$), although somewhat less lyophobic, also performs well.

The nonporous lyophilic layer 28 can be made from a variety of materials. "Nonporous" is defined as the inability to pass pressurized nitrogen gas through the membrane as described in the ASTM F 316-70 standard test method. Selected liquids, such as water, can pass through the layer by chemical interaction with the lyophilic material. The layer is permselective to some chemicals, such as salts dissolved in water, and it provides a mechanical barrier to passage of particles, bacteria, and viruses. In desalination the nonporous lyophilic layer 28 is permselective to water but selects out salt thereby preventing salt build-up at the lyophobic layer which results in intrusion of salt water into the pores of the lyophobic layer 26. Thus water-logging is prevented and continuous evaporation/condensation occurs within the pores 29.

The material selected for the lyophilic layer and its method of deposit or coating is selected with several factors taken into consideration. It must adhere well to the lyophobic substrate. It should be resistant to both mechanical abrasion and chemical damage from the distilland. It should be coatable as a thin continuous layer on the surface of the porous substrate. It should allow certain liquids to pass through to the lyophobic layer of the membrane.

Many organic coatings are acceptable for a lyophilic layer. Examples are: plasma polymerized allylamine; dehydrated polyvinyl alcohol; and polyacrylic acid. The latter coating is deposited on the surface of the hydrophobic layer which has been modified by electrical discharge to accept a graft of the acrylic acid monomer to form the polyacrylic acid layer.

The prevention of water-logging by the lyophobic membrane having an essentially nonporous lyophilic coating may be explained by the combination or interaction of several phenomena. It is desirable to have the lyophilic coated layer permselective in nature, highly favoring the diffusion of water molecules, or more precisely their H+ and OH− ions, through the essentially nonporous layer. The permselectively of the layer allows for a much lower concentration of salt at the liquid-vapor interface 32 than in the bulk distilland 12.

It is believed that the lyophilic layer adjacent the lyophobic layer alters the liquid-vapor interface 32 in such a way that liquid which reaches the interface does not intrude within the pores 28. The lyophilic layer 28 interacts with the lyophobic layer 26 to change the surface curvature of the liquid-vapor interface to enhance the evaporation rate. Therefore, both lyophilic and lyophilic layers are needed to overcome the water-logging problem.

The thickness of the lyophilic coating must be sufficient to close the pores of the lyophobic membrane. The minimum thickness is on the order of twice the pore diameter at the surface. Since the smaller asymmetric pore openings of the lyophobic membrane of FIG. 3 are smaller than those of the symmetric membrane of FIG. 2, the membrane of FIG. 3 does not require as great a degree of thickness of the lyophilic coating.

FIG. 3 is an enlarged sectional view of an idealized asymmetrically shaped porous lyophobic membrane having deposited thereon an essentially nonporous lyophilic coating. The only difference between the membranes of FIG. 2 and FIG. 3 is in the shape of pore 29 of FIG. 2 and that of pore 35 of FIG. 3. Pore 35 is a representative asymmetric shape; the exact configuration of each pore is undeterminable.

The following are examples of membranes prepared in accordance with this invention.

EXAMPLE 1

A thin-skin microporous lyophobic layer was prepared from polyvinylidene flouride ($PVF_2$). It was characterized by asymmetrically shaped pores of which the maximum diameter is 0.3 μm. The entire layer had a thickness of 5 mils.

Although many organic monomers are suitable for the lyophilic coating, allylamine is especially suitable for coating by plasma polymerization. Allylamine is permselective, rejecting sodium chloride. It also exhibits good water flux when plasma polymerized.

The lyophobic $PVF_2$ was coated with allylamine in the following manner. The $PVF_2$ was placed in a vacuum bell jar with the small pored thin skin surface to be coated facing the plasma field. The bell jar was evacuated to a base pressure of about $10^{-2}$ torr. Then the desired flow of allylamine monomer was introduced. Membranes have been prepared by this method at a monomer pressure of 0.25 torr and an allylamine flow rate of 16.5 S.T.P. $cm^3$/min into the 4 liter bell jar. The discharge power was 40 watts.

When the pressure stabilized within the jar, the electric discharge was initiated by turning on the system's RF generator. The resulting plasma produced from the monomer formed a thin polymer coating on the exposed side of the substrate disk. The desired minimum coating thickness is determined by the thickness necessary to close the lyophobic pores. Generally, this thickness is about twice the diameter of the pores themselves. Therefore, the coating was allowed to become about 0.6 μm thick.

For a description of the preparation of membranes prepared by plasma polymerization of allylamine, see Bell, et al., "A Study of the Performance of Chemical Characteristics of Composite Reverse Osmosis Membranes prepared by Plasma Polymerization of Allylamine," 19 *Journal of Applied Polymer Sciences* 1911 (1975).

Test results showed that compared to the single hydrophobic membrane which had a rapid distillate production rate drop off and complete stoppage in four days, the membranes of this example were effective for 180 days without showing signs of stopping. At that time the experiment was discontinued.

EXAMPLE 2

A thin-skin asymmetrically microporous lyophobic layer was prepared from polytetrafluoroethylene (PTFE) in which the mean pore diameter was 0.23 μm. The layer was coated with allylamine as in Example 1 to form a continuous thin composite lyophilic/lyophobic membrane.

EXAMPLE 3

The lyophobic layer of this membrane was prepared from $PVF_2$ as in Example 1. The essentially nonporous lyophilic coating consisted of a polyacrylic acid formed by a surface grafting technique. Many other monomers would also be suitable for surface grafting the lyophilic coating onto the lyophobic layer to form a composite membrane.

The $PVF_2$ membrane was exposed to an argon electric discharge at 0.25 torr. This activated the surface to produce sites with high chemical reactivity. Acrylic acid monomer was uniformly applied to the prepared surface, thereby polymerizing spontaneously to produce a graft polymer chemically bonded to the substrate surface. For description of the surface grafting technique see Fales, et al., "Surface Grafting of Textile Materials," 27 *Research/Development* 53 (1976).

EXAMPLE 4

This membrane consisted of a lyophobic $PVF_2$ layer, as described in Example 1, and a dehydrated polyvinyl alcohol lyophilic coating.

An emulsion was prepared by adding 2.0 weight percent sulfuric acid to a 5.0 weight percent polyvinyl alcohol aqueous solution at 75° C. The $PVF_2$ surface was coated with this emulsion, and oven annealed at 125° C. for approximately ten minutes. On drying the coating became non-water-soluble and nonporous.

These examples demonstrated clear superiority over prior art membranes for thermal distillation. The primary improvement stems from the improved rate of distillation.

The distillation rate is a function of the salt concentration at the evaporation surface. The lower the salt concentration at the evaporation surface, the higher the distillation rate. To reduce the salt concentration at the evaporation surface the materials selected for the lyophilic layer are permselective, favoring the distilland and hindering salt passage, thereby screening out some of the salt before it reaches the liquid-vapor evaporation interface. Due to the thinness (approximately 0.1 mil) of the lyophilic layer, this salt readily diffuses back into the bulk distilland. Thus, the lyophilic layer provides additional protection from salt intrusion in the lyophobic membrane pores and reduces the chance for water-logging.

This initial screening of the salt is an improvement over a composite membrane having a cellulose acetate lyophilic layer which requires a thick support structure. In such a membrane no salt separation occurs until the distilland reaches the liquid-vapor interface and evaporation commences. Since diffusion of the salt back through the thick support structure is not as facile, more salt accumulates at the liquid-vapor interface.

The permselectivity of the lyophilic coating suggests that pure water is transported through the continuous nonporous layer by a mechanism of a concentration gradient and ionic ambipolar diffusion.

Another advantage of the lyophilic coating on the membrane of this invention is the prevention of backstreaming of distillate into distilland in the event of a defect in the pore structure of the lyophobic layer. Occasionally, there will be a large diameter pore which will water-log. In the conventional single hydrophobic membrane of FIG. 1, having a pressure direction from distillate to distilland, distillate will flow through the liquid filled pore to the distilland. It has been estimated that the volume of water back-streaming through less than 5% of the pores at a pressure head of one foot of water would equal or surpass the distillation production rate. Therefore, prevention of such losses greatly enhances the commercial value of thermal membrane distillation as described herein.

We claim:

1. An improved thermal membrane distillation apparatus for distilling aqueous solutions comprising:
   a. a means for providing a body of distilland;
   b. a composite membrane having
      (1) a microporous lyophobic layer;
         (a) selected from the group consisting of polytetrafluoroethylene and polyvinylidene fluoride,
         (b) wherein the average pore diameter is less than 0.4 millimicrons; and
      (2) wherein the improvement comprises means for preventing liquid intrusion into the pores of the lyophobic layer including a deposited layer of an essentially nonporous lyophilic coating on the lyophobic layer;
         (a) the lyophilic coating being selected from the group consisting of polyallylamine, polyacrylic acid and dehydrated polyvinyl alcohol,
         (b) wherein the lyophilic coating is positioned adjacent to the distilland; and
   c. a means sized for preventing said liquid intrusion by providing a sufficient temperature gradient across said microporous lyophobic layer so that the liquid distilland evaporates on the distilland of the pores of the lyophobic layer and condenses on the liquid distillate side of the pores of the lyophobic layer.

2. Thermal membrane distillation apparatus as in claim 1 in which the lyophilic coating is deposited on the lyophobic layer by surface grafting.

3. Thermal membrane distillation apparatus as in claim 1 in which the lyophilic coating is polyacrylic acid.

4. Thermal membrane distillation apparatus as in claim 1 in which the lyophilic coating is deposited by roll coating.

5. Thermal membrane distillation apparatus as in claim 1 in which the lyophilic coating is dehydrated polyvinyl alcohol.

* * * * *